F. S. McMANIGAL.
WINDMILL.
APPLICATION FILED MAY 31, 1919.
1,333,987.
Patented Mar. 16, 1920.
2 SHEETS—SHEET 1.
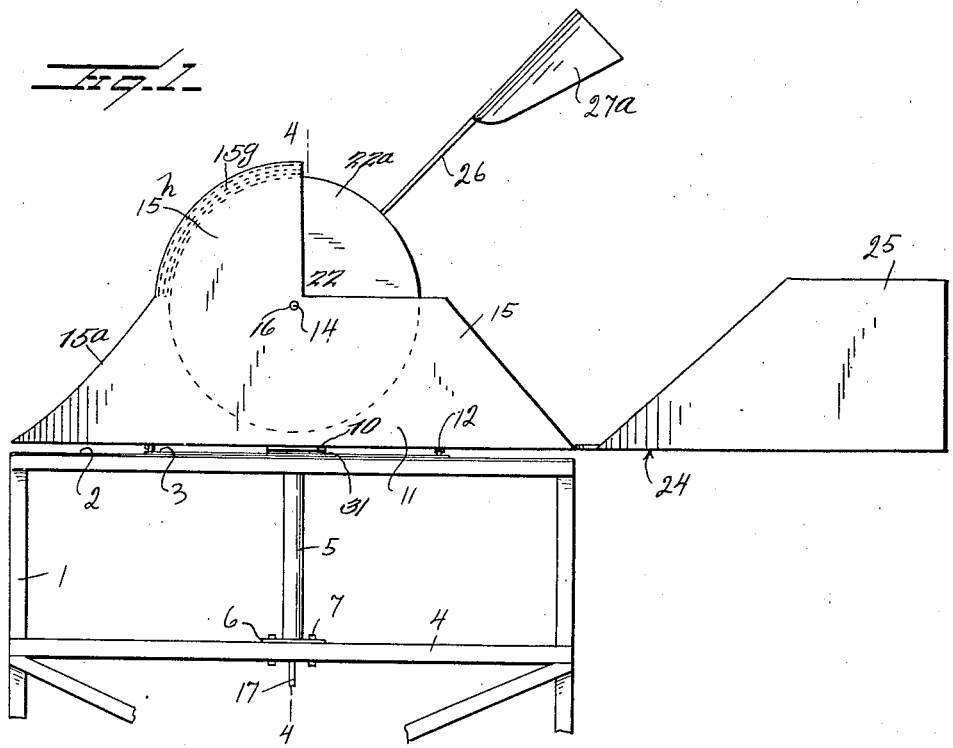
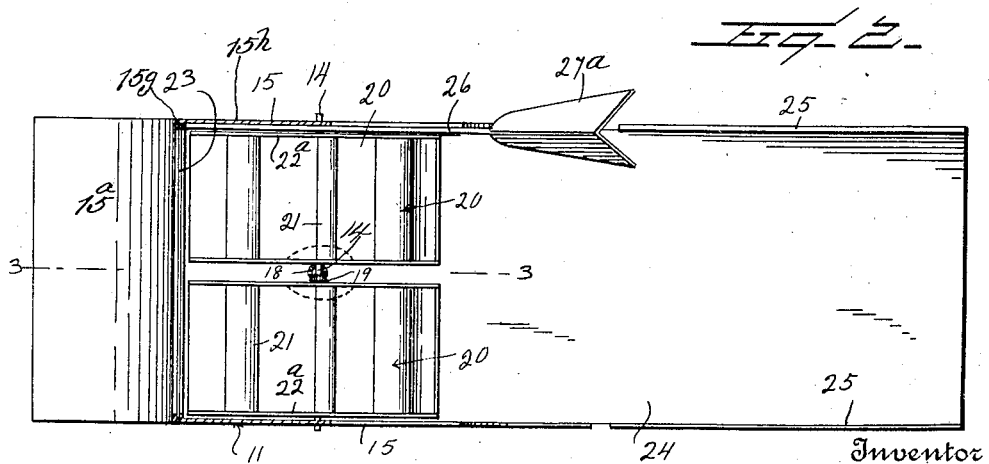
Inventor
F. S. McManigal
By Watson E. Coleman
Attorney

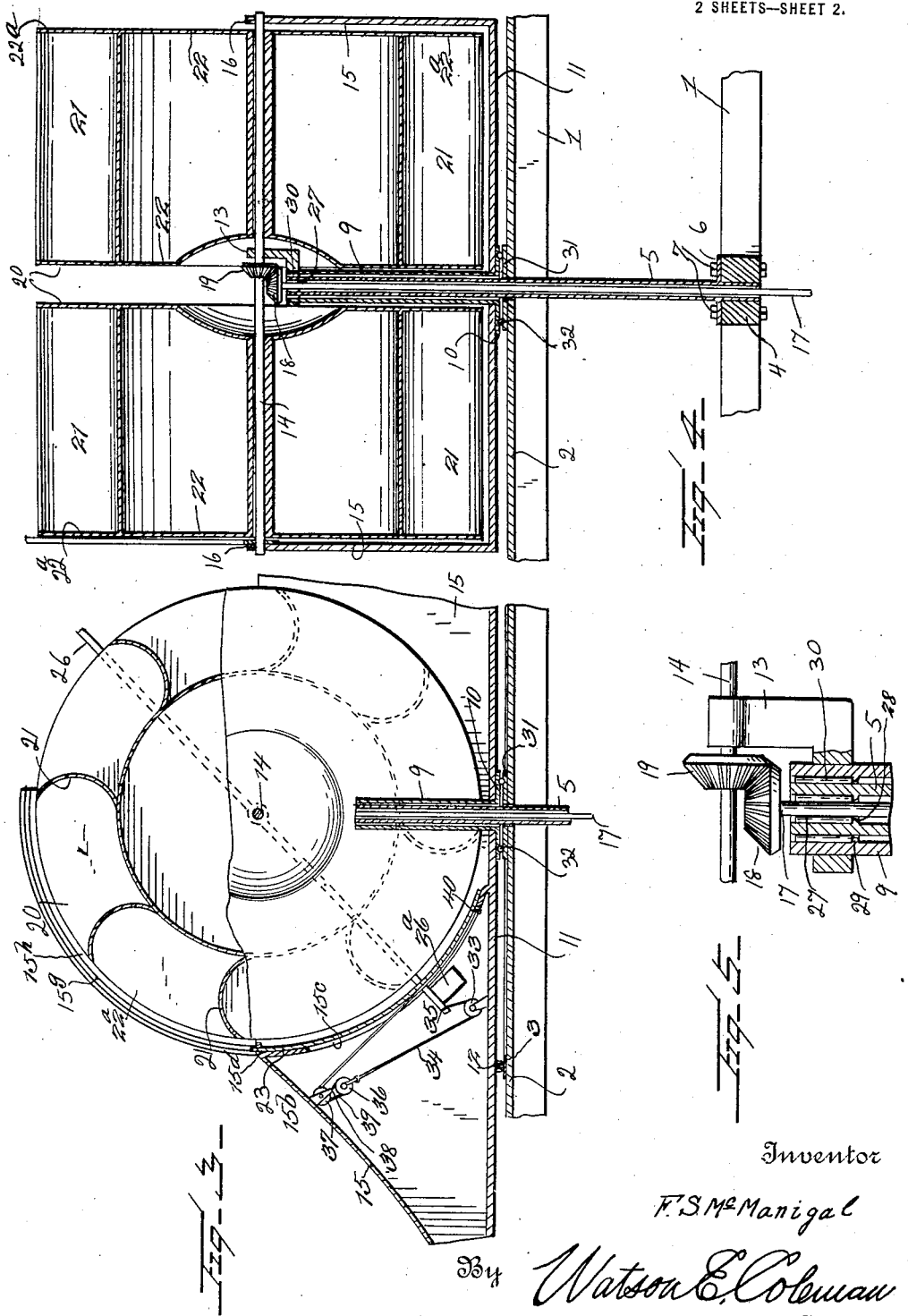

UNITED STATES PATENT OFFICE.

FRANK S. McMANIGAL, OF THERMOPOLIS, WYOMING.

WINDMILL.

1,333,987.  Specification of Letters Patent.  Patented Mar. 16, 1920.

Application filed May 31, 1919. Serial No. 300,975.

*To all whom it may concern:*

Be it known that I, FRANK S. MCMANIGAL, a citizen of the United States, residing at Thermopolis, in the county of Hot Springs and State of Wyoming, have invented certain new and useful Improvements in Windmills, of which the following is a specification, reference being had to the accompanying drawings.

This invention relates to an improved windmill, preferably designed for operating well pumps, but not necessarily, for it is obvious, it may be adapted for operating various other machinery, such as grain grinding machinery and the like.

The invention aims to provide a windmill, especially adapted for generating considerable power, and one which will transmit considerable power under the influence of light wind, as well as under a heavy wind.

The invention further aims to provide a windmill wheel, constructed on the principle of a turbine, whereby the wind enters the semi-circular blades of the windmill wheel with considerable pressure, thereby imparting rapid revoluble movements to the wheel, thereby generating considerable power which may be transmitted by gearing to any suitable machinery to be operated.

A further object of the invention is to provide a turbine windmill wheel of any suitable diameter, preferably as illustrated, but not necessarily, so as to position the blades at a requisite distance from the center of the wheel, the dimensions and proportions, as at present shown and described having been found most preferable.

A further object of the invention is to position the turbine blades pitched at slight inclinations to the periphery of the body of the turbine wheels, so that, since the turbine blades are curved semi-circular in cross-section, the wind, will effectively enter the concavities of the blades, in order to impart rapid revolutions to the wheel, and therefore generate considerable power.

The invention further aims to provide means for housing the lower half of the turbine wheel, in order to permit the wind to impinge into the concavities of the turbine blades, on the upper half of the wheel only, thereby insuring that rapid revoluble movements will be imparted to the wheel. It is obvious that should the lower half of the wheel be exposed, the pressure of wind will be practically equalized on the blades above and the blades below at certain times, and at other times pressure may be greater above or greater below, hence the movements will not be continuous in one direction, hence the provision of the housing means.

The invention further aims to provide anti-frictional means coöperating with the gear connections between a reciprocating member and the shaft of the revoluble turbine wheel, in order to offer as little friction as possible on the parts, thereby insuring a maximum degree of power consistent with the improved construction herein set forth and illustrated.

The invention further aims to provide a frame for the support of the housing means, which is capable of revoluble movement in one direction or the other in a horizontal plane, in combination with tail blades carried by the frame to be impinged upon by the wind, in order to shift the frame in one direction or the other, for the purpose of positioning the blades of the turbine wheel in the direction of the wind, to insure revoluble movements to be imparted to the wheel.

The invention further aims to provide means to throw the windmill wheel out of gear.

A further object of the invention is to provide means between the windmill tower and the rockable frame to permit the rockable frame to freely turn, according to the direction it is to move, incident to the pressure of the wind upon the tail blades. This means between the upper end of the tower and the rotatable or rocking frame, also acts to hold the rockable frame substantially in a true perpendicular position, that is, keeps the frame from slightly tilting, thereby relieving the strain upon the bearing members of the anti-frictional means between the turbine wheel and the member to be reciprocated.

A further object of the invention is to provide a windmill turbine wheel, which will generate the highest efficiency of power.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be herein-after set forth, shown in the drawings and claimed.

In the drawings:

Figure 1 is a view in side elevation of the upper portion of a windmill tower showing the turbine windmill wheel as applied to its rockable or rotatable frame, and constructed in accordance with the invention.

Fig. 2 is a plan view of the same.

Fig. 3 is a sectional view on line 3—3 of Fig. 2.

Fig. 4 is a sectional view on line 4—4 of Fig. 1, showing the structure of the apparatus at right angles to that shown in Fig. 3.

Fig. 5 is a detail view of the gear connections between the shaft 17 and the shaft 14, showing the roller bearings 27 and 30.

Referring to the drawings, 1 designates a windmill tower, on the top of which a supporting bed plate 2 is mounted. This bed plate is provided with a circular track 3. The tower frame is provided with a transverse suporting bar 4, in a bearing of which the lower end of a fixed tubular bearing 5 is mounted. This tubular bearing 5 has an annular flange 6, to receive bolts 7, which also pass through the supporting bar 4, thereby holding the tubular bearing in a perpendicular position.

Arranged in surrounding or telescopical relation to the perpendicular tubular bearing, is a revoluble bearing shaft 9, which has at its lower end an annular flange 10, which supports the frame 11, which is capable of rocking or revoluble movements in different directions, in a horizontal plane, according to the direction the wind might be blowing. This frame is U-shaped in cross-section, and the under face of the base of the frame is provided with anti-frictional roller bearings 12, to ride on the track 3. By means of these roller bearings riding upon the track, the frame is maintained in a position, whereby it is incapable of tilting to any great degree.

The upper end of the rotating tubular bearing shaft carries an angular bracket 13, in a bearing of which a shaft 14 is mounted. The end portions of the shaft 14 are mounted in bearings of the sides 15 of said U-shaped frame, as shown at 16. A drive shaft 17 extends concentrically through the fixed bearing shaft or sleeve 5, and may be geared in any suitable manner (not shown) to a pump rod (not shown) or to any other suitable machinery (not shown) so that power may be transmitted thereto. The upper end of this shaft 17 has mounted thereon a bevel gear 18, which meshes with a similar bevel gear 19 of the shaft 14. Preferably, but not necessarily, these bevel gears are designed to be substantially of the diameters shown. It is to be noted that gears of various diameters may be employed in connecting the shaft 17 to the shaft 14, so that the power to be generated by the shaft 14 may be varied.

At the present time it is the aim to provide several different gears, (not shown) so that the power to be ultimately derived from the shaft 14 may be varied, according to the nature of machinery to be operated by the shaft 17. Mounted upon and keyed fast to the shaft 14 is a pair of wind propelled turbine wheels 20, and it is to be noted that the cylindrical body of each of these wheels is provided with a plurality of elongated blades 21, which are semi-circular in cross-section. These blades are positioned upon the body of the wheel (which is practically a drum) in slightly inclined position relatively to the cylindrical surface of the body, so that the wind may readily enter the concavities of the blades, in order to impart motions to the wheel. Preferably, but not necessarily, the bodies are designed to be hollow, and have their ends closed by the head pieces 22. The bodies or drums are supplied with annular flanges 22$^a$, so as to close the spaces at the ends of the blades, in order to prevent the deflection of the wind after it impinges or enters into the concavities of the blades. It is to be observed that the inner or adjacent ends of the bodies or drums of the wheels are shaped or cut away in such wise as to permit of the positioning of the bracket 13 and the gears 18 and 19, between the wheels. Fixed between the sides of the U-shaped frame and curved concentrically with the wheels is a shield 23, which is positioned in such wise and concentrical with the wheels, in order to shield the lower half of the wheels, thereby preventing the wind from striking the blades while they are traveling in their circuit adjacent the base of the frame. By means of this shield the wind will only contact or enter the concavities of the blades while they are traveling in a direction over the bodies of the wheels. In other words, the wheels are of an over-shot type. It has been found that blades of this particular type, when the wind enters or impinges into the concavities, cause the wheels to travel at a considerable rate of speed, in order that power of a great degree may be transmitted to the shaft 17 through the medium of the gear connections 18 and 19. It has also been found that a light wind will coöperate with the blades of this type, and will furnish almost as much power, as when driven by a heavy steady wind.

It is to be noted that one end of the frame 11 has its sides 15 connected by the curved deflector blade or piece 15$^a$, which deflects the wind upwardly and toward the concavities of the blades 21. A member 26 is pivotally mounted upon the shaft 14, near one end, between one of the ends of one of the wheels and one of the sides 15 of the frame 11. The upper end of the member 26 is provided with a pair of blades 27$^a$, and the other end of the member 26 has a weight 26ª, acting to normally hold the member 26 in the position shown in Figs. 1, 2 and 3. A pulley 33 is carried by the upper face of the bottom of the frame 11, and passing over this pulley 33 is a cable or rope 34. One end of the cable or cord 34 is attached to the lower end of the member 36, as shown at 35, and its other end is attached to the pulley 36. A pulley 37 is carried by the curved deflecting wall 15ª, and attached to the casing of the pulley 37 as shown at 38 is a cord or cable 39, and which in turn is connected to an eye 40 at the lower end of the shield 23. This shield 23 conforms to the supporting guide plate 15ᵇ, and is supported thereby, and operative through the guide 15ᵈ. This supporting guide plate (which is curved) has a slot 15ᶜ, through which the eye 40 plays, as the shield is moved upwardly and downwardly. For instance should the wind be severe, and would operate the turbine wheels too rapidly (which would be damaging to the gearing of the windmill), the wind would act upon the blades 27ª of the member 26, and overcome the counterbalance weight 26ª, and in fact oscillate the member 26 downwardly. The lower end of the member 26 would then pull upon the cable 34, which would in turn pull upon the pulley 36, and operate the cable or cord 39, and raise the shield 23 upwardly in its guides, thereby covering the blades of the upper part of the turbine wheels. In fact, this shield is wide enough to cover both wheels, that is the blades of their upper portions. It is to be noted that the upper part of the slot 15ᶜ would be engaged by the eye 40, and limit the upward movement of the shield. Just so soon as the force of the wind decreases, the counterbalance weight 26ª would overcome the weight of the blades and restore the member 26 to its normal position, as well as returning the shield to its normal position, thereby allowing the wind to again impinge into the cavities of the blades. By means of the member 26 and its blades 27ª it is obvious that the speed of the turbine wheels may be readily regulated or governed, according to the force of the wind.

Preferably, but not necessarily, formed integral with the base of the U-shaped frame (which may be any other suitable shape) is an extension 24, and rising upwardly from its opposite longitudinal edges are blades 25. This extension 24 and its blades 25 constitute a tail member, with which the wind contacts or impinges, for shifting or rocking the U-shaped frame, in one direction or the other, so as to position the turbine wheel in a direction with the wind, so that the wind may impart revoluble movements to the wheel.

Interposed between the upper end portion of the shaft 17 and the fixed bearing shaft or sleeve 5 is a plurality of roller bearings 27, the shoulder 28 of the inner surface of the fixed bearing shaft or sleeve acting to support the roller bearings 27 in their positions. Interposed between the fixed bearing shaft or sleeve and the revoluble bearing shaft or sleeve of the frame and supported by the shoulder 29, is a plurality of anti-frictional rollers 30. By virtue of these roller bearings 27 and 30, the shaft 17 and the revoluble bearing shaft or sleeve may freely rotate with as little friction as possible.

Interposed between the flanges 10 and 31 of the revoluble bearing shaft or sleeve 9, and the fixed bearing shaft or sleeve 5 respectively are anti-frictional ball bearings 32, which travel in the race-ways of said flanges, which anti-frictional ball bearings, together with the roller bearings enable the revoluble parts to freely rotate with a minimum amount of friction, in order to offer as little resistance as possible to the pressure of the wind on the blades of the turbine wheels.

The sides 15 of the U-shaped frame are provided with extensions 15ʰ having curved guides 15ᵍ, which are continuations of the guides 15ᵈ, in which the shield or deflector 23 is guided, when moved to a position over the upper part of the blades of the turbine wheels.

The invention having been set forth, what is claimed as new and useful is:

1. In a device as set forth, the combination with a tower frame having a fixed tubular bearing, of a drive member mounted in said tubular bearing, a rockable tubular bearing shaft or sleeve in surrounding relation to the fixed tubular bearing, the upper ends of the drive member and the fixed and rockable tubular bearing shafts or sleeves having anti-frictional connections, the lower end of the rockable bearing shaft or sleeve having an anti-frictional supporting bearing, a second frame movable with the rockable bearing sleeve or shaft, a shaft mounted in the second frame at right angles to the driving member and provided with gear connections thereto, and over-shot wind propelled turbine wheels carried by the shaft, whereby when the wind impinges upon the blades of the turbine wheels, revoluble movements will be imparted to the shaft.

2. In a device as set forth, the combination with a tower frame having a fixed tubular bearing, of a drive member mounted in said tubular bearing, a rockable tubular bearing shaft or sleeve in surrounding relation to the fixed tubular bearing, the upper ends of the drive member and the fixed and rockable tubular bearing shafts or sleeves having anti-frictional connections, the lower end of the rockable bearing shaft or sleeve having an anti-frictional supporting bearing, a second frame movable with the rockable bearing sleeve or shaft, a shaft mounted in the second frame at right angles to the driving member and provided with gear connections thereto, and over-shot wind propelled turbine wheels carried by the shaft, whereby when the wind impinges upon the blades of the turbine wheels, revoluble movements will be imparted to the shaft, each of said turbine wheels having elongated blades semi-circular in cross-section, disposed in inclined positions relatively to the cylindrical surface of the body of said wheels, so that the wind may readily enter the concavities of the blades, the ends of each wheel having annular flanges closing the ends of the spaces between the blades, thereby preventing escape of the wind, as it enters the concavities of the blades.

3. In a device as set forth, the combination with a tower frame having a fixed tubular bearing, of a drive member mounted in said tubular bearing, a rockable tubular bearing shaft or sleeve in surrounding relation to the fixed tubular bearing, the upper ends of the drive member and the fixed and rockable tubular bearing shafts or sleeves having anti-frictional connections, the lower end of the rockable bearing shaft or sleeve having an anti-frictional supporting bearing, a second frame movable with the rockable bearing sleeve or shaft, a shaft mounted in the second frame at right angles to the driving member and provided with gear connections thereto, and over-shot wind propelled turbine wheels carried by the shaft, whereby when the wind impinges upon the blades of the turbine wheels, revoluble movements will be imparted to the shaft, and a shield for a portion of the lower half of the turbine wheels, so that the wheels may operate in an over-shot direction.

4. In a wind mill, the combination with a tower frame, of a driving member mounted into the fixed bearing of said frame, a second frame mounted on the bearing to rock in a horizontal plane, a horizontal shaft in bearings of the second frame, said second frame provided with arcuate guides concentric with said horizontal shaft, an overshot wind propelled turbine wheel rotatable with the horizontal shaft, gear connections between the turbine wheel shaft and the driving member, an arcuate shield mounted in said arcuate guides and the second frame and adapted to be moved in a position to cover the blades of the upper parts of the wheel to prevent the wind from impinging into and upon the blades, and a wind actuated device pivotally mounted on the horizontal shaft and having connections with the shield for operating the same.

5. In a wind mill, the combination with a tower frame having a vertical fixed tubular bearing, of a driving member rotatable in said tubular bearing, a second frame capable of revoluble movement in a horizontal plane about said tubular bearing, a horizontal shaft mounted in bearings of said second frame, said second frame provided with upwardly protruding extensions having arcuate guides concentric with said horizontal shaft, overshot wind propelled turbine wheels keyed on the horizontal shaft, said turbine wheels comprising bodies having curved blades, gear connections between the horizontal shaft and the driving member, the adjacent heads of the bodies of the turbine wheels having concentric concavities forming a housing for said gear connections, an arcuate shield mounted in said arcuate guides and adapted to move in a position to cover the blades of the upper part of the bodies, to prevent the wind from impinging into and upon the blades, a wind actuated device pivotally mounted on the horizontal shaft and having connections with the shield for operating the same, and gravity means on said device to return it to initial position.

In testimony whereof I hereunto affix my signature in the presence of two witnesses.

FRANK S. McMANIGAL.

Witnesses:
ALBERT McNEIL,
JOHN DAVIES.